(12) United States Patent
Schaefer (10) Patent No.: US 8,833,152 B2
(45) Date of Patent: Sep. 16, 2014

(54) APPARATUS AND METHOD FOR MEASURING A TIRE PRESSURE FROM THE TIRE FOOTPRINT

(75) Inventor: Frank Schaefer, Weilheim (DE)

(73) Assignee: MAHA Maschinenbau Haldenwang GmbH & Co. KG, Haldenwang (DE)

( * ) Notice: Subject to any disclaimer, the term of this patent is extended or adjusted under 35 U.S.C. 154(b) by 73 days.

(21) Appl. No.: 13/809,063

(22) PCT Filed: Jul. 11, 2011

(86) PCT No.: PCT/EP2011/061761
§ 371 (c)(1),
(2), (4) Date: Mar. 6, 2013

(87) PCT Pub. No.: WO2012/004413
PCT Pub. Date: Jan. 12, 2012

(65) Prior Publication Data
US 2013/0186194 A1 Jul. 25, 2013

(30) Foreign Application Priority Data
Jul. 9, 2010 (DE) .......................... 10 2010 026 730

(51) Int. Cl.
| | | |
|---|---|---|
| *B60C 23/02* | (2006.01) | |
| *G01L 17/00* | (2006.01) | |
| *G01M 17/02* | (2006.01) | |
| *G01B 11/22* | (2006.01) | |
| *B60C 23/04* | (2006.01) | |

(52) U.S. Cl.
CPC .............. *B60C 23/04* (2013.01); *G01L 17/005* (2013.01); *G01M 17/02* (2013.01); *G01B 11/22* (2013.01); *G01M 17/027* (2013.01)
USPC ........................................................ 73/146.2

(58) Field of Classification Search
USPC ................................................ 73/146–146.8
See application file for complete search history.

(56) References Cited

U.S. PATENT DOCUMENTS

| | | | |
|---|---|---|---|
| 5,347,588 A | * | 9/1994 | Wilson .......................... 382/104 |
| 5,445,020 A | | 8/1995 | Rosensweig |
| 6,343,506 B1 | * | 2/2002 | Jones et al. .................. 73/146.2 |

(Continued)

FOREIGN PATENT DOCUMENTS

| | | |
|---|---|---|
| DE | 20200489 U1 | 5/2002 |
| DE | 102004055701 A1 | 6/2006 |

(Continued)

*Primary Examiner* — Andre Allen
(74) *Attorney, Agent, or Firm* — Bachman & LaPointe, P.C.

(57) ABSTRACT

An apparatus for measuring the pressure of a tire on a moving vehicle, comprising measuring device (14, 18, 24) which is provided on or inside a floor or ground so as to interact with the tire and which generates an electronically analyzable measurement signal in reaction to the tire driving over the measuring device, and analysis unit (22, 40) which output a tire pressure signal corresponding to the tire pressure in reaction to the measurement signal. The measuring device includes an optical unit (18) for acquiring a tire width as the width of a tire footprint forming when the tire drives over the floor/ground. The analysis unit is designed to determine a footprint length from a series of tire width data generated by the optical unit and/or from a pattern of a pressure measurement signal generated by the measuring device and to determine the tire pressure from a footprint area calculated as a function of the length and width of the footprint and from a force applied to the footprint area by the tire.

13 Claims, 5 Drawing Sheets

(56) References Cited

U.S. PATENT DOCUMENTS

| | | | |
|---|---|---|---|
| 6,823,728 B1 * | 11/2004 | Barnes | 73/146 |
| 7,150,187 B2 | 12/2006 | Caretta | |
| 7,797,995 B2 | 9/2010 | Schäfer | |
| 2004/0216520 A1 | 11/2004 | Caretta | |
| 2008/0216567 A1 * | 9/2008 | Breed | 73/146.5 |
| 2009/0320581 A1 * | 12/2009 | Angell et al. | 73/146 |
| 2010/0024538 A1 * | 2/2010 | Hammerschmidt | 73/146 |
| 2010/0324858 A1 * | 12/2010 | Pannek et al. | 702/141 |
| 2013/0111984 A1 * | 5/2013 | Dorfi | 73/146 |

FOREIGN PATENT DOCUMENTS

| | | |
|---|---|---|
| EP | 0656269 A1 | 6/1995 |
| EP | 1952092 B1 | 8/2008 |
| WO | 0242096 A1 | 5/2002 |

* cited by examiner

APPARATUS AND METHOD FOR MEASURING A TIRE PRESSURE FROM THE TIRE FOOTPRINT

BACKGROUND OF THE INVENTION

The present invention relates to an apparatus for measuring the tire pressure according to the preamble of the main claim. In addition, the present invention relates to a method for measuring the tire pressure, in particular to a method for operating the apparatus, and to the use of such an apparatus.

From the prior art it is known to measure the tire pressure of vehicle when a vehicle is stationary. This is typically done in that an operator connects a (suitably calibrated) air pressure measuring apparatus to the tire valve of the tire which is to be correspondingly checked, reads off the tire pressure from a manometer scale and can then make air pressure corrections within a limited scope by, if appropriate, an additional functionality of the typically portable apparatus. However, such a procedure is awkward, requires a vehicle to be stationary and is impracticable, in particular in conjunction with the measuring of a plurality of tires and/or multiple vehicles, such as is the case in conjunction with regular checking of commercial vehicle fleets (referred to as fleet checks). This then leads to a situation in which the measurement of the tire pressure takes place only at comparatively long intervals, which in turn results in a comparatively large number of vehicle tires being driven with an incorrect air pressure, typically an underpressure. The consequences which are disadvantageous individually and in overall economic terms are increased consumption of fuel, increased tire wear and disadvantageous effects on the road handling of the vehicle.

For this reason, selective tests have been performed in order to measure the tire pressure when the vehicle is moving. This typically means that a manometer connection or hose connection to the tire valve cannot be formed. Instead, tire pressure sensors are provided for continuously monitoring the tire pressure in the interior of the rim, typically attached there to a tire valve, and said tire pressure sensors have wireless means, typically implemented with a high frequency, for transmitting tire pressure data to the outside. However, this procedure is costly, potentially susceptible to faults and, in particular when there are frequent tire changes, gives rise to the risk of damage to the expensive electronics, with the result, particularly in the field of commercial vehicles or trucks, such tire pressure sensors have not become established practice in a tire.

The object of the present invention is therefore to provide an apparatus for measuring the tire pressure of a tire provided on a moving vehicle, which apparatus has, without the disadvantages of the measurement of the tire pressure in a stationary state, nevertheless has a low degree of technical complexity and expenditure on assembly, a high degree of reliability, load bearing capacity and safety against destruction as well as good measuring accuracy so that it is suitable, in particular, for measuring the tire pressure in the context of a commercial vehicle fleet, such as for example in the field of trucks.

SUMMARY OF THE INVENTION

The object is achieved by the apparatus and method of the present invention.

In a fashion which is advantageous with respect to the invention, initially optical recording means are provided as functional components of the measuring means on the or in an underlying surface in such a way that said recording means can detect, typically by recording images, a tire width of the tire and can infer what is referred to as the footprint width therefrom. The "footprint" of the vehicle is to be understood here as that essentially planar tire profile surface which is seated on the underlying surface at a respective time and is determined by its footprint width (approximated by the tire width to be measured in this region) and its footprint length (measured in the direction of travel of the movement or of the traveling over).

While, according to the present invention, the optical recording means can be acquired, in an otherwise known fashion, by evaluation of a corresponding digital image, the present invention provides two ways of being able to determine the footprint length: on the one hand, from a profile of a force measuring signal or pressure measuring signal which corresponds to the traveling over by the vehicle or by the tire, wherein the footprint length can then be inferred from this force signal profile by, in particular, evaluating the edge behavior and duration of the force signal, and additionally or alternatively by an evaluation of the sequence, generated following optical evaluation means, of a plurality of tire profile-side recordings (with a respective tire width) from whose time behavior it is then alternatively also possible to infer the footprint length. Within the scope of the invention the evaluation means then make it possible to acquire the footprint area (by multiplication of the footprint length and footprint width) and to obtain the desired tire pressure signal value by taking into account a correction function. This correction function takes into account the footprint width, a possible ratio of groove to tread area (which can be detected in turn from the abovementioned digital image of the optical recording means), a particular shape of the footprint which deviates from a rectangle, or the like. This correction function can be acquired and configured in a table form, or alternatively in the form of a functional relationship, and in the simplest way as a simplifying constant, wherein approximately suitable comparison measurements and calibration measurements for the configuration of this correction function provide the suitable information.

This procedure according to the invention therefore permits tire pressure measuring stations to be implemented which permit, in the manner of flowing traffic, the continuous measurement of the tire pressure of virtually any vehicles while they are moving continuously, wherein a use in the field of utility vehicles or trucks is preferred but cannot be understood in a restrictive fashion.

It has proven useful here as a particularly preferred development of the invention to assign temperature sensor means which interact with the tire in a contactless fashion to the measuring means or to integrate said temperature sensor means therein, since the measurement which is made possible by the present invention during movement, and therefore leads in virtually flowing traffic, particularly in a commercial vehicle environment, to a situation in which not only cold tires are subjected to the measurement of tire pressure according to the invention but also operational warm tires (wherein a tire operating temperature of 80° C. and more can certainly be reached). Within the scope of the invention it has become apparent that the tire temperature has a significant influence on footprint-based measurement of the tire pressure, which is external as in the present invention, with the result that temperature compensation is preferred in order to reach reliable measured values. In addition there is the fact that standard values and/or predefined values for a tire pressure are typically in the region of 20° C., with the result that in order to standardize the measuring behavior a temperature compensation of the measurement of the tire pressure is also appropriate.

In the basic concept according to the invention of measuring in flowing traffic it is provided in this context also to configure the temperature measurement in a contactless fashion with respect to the tire, wherein more preferably radiation-based temperature sensors, in particular infrared temperature sensors, have also proven favorable here, which infrared temperature sensors can more preferably be directed at a (for example inner) tire wall of the tire to be measured.

If a force measurement apparatus for the measuring means is used within the scope of preferred embodiments of the invention for measuring the footprint length, it is preferred within in the scope of preferred developments of the invention to provide a plurality of force sensors which are mechanically coupled to one another, are designed to be traveled over by the vehicle, and which are also preferably connected, for example, by means of a common pressure plate for coupling, over which pressure plate the tire then travels.

It lies within the scope of practical embodiments of the invention to generate repeatedly respective image sensor signals or force sensor signals for a tire which is to be respectively measured, with the result that the evaluation means according to the invention can utilize signal sequences for evaluation.

In this context, with respect to the force sensor apparatus according to the development a signal repetition frequency in the range between approximately 10 and 1000 Hz, and with respect to the optical image recording means a number of at least three, preferably at least five, successive individual images for the successive evaluation, is preferred (given image repetition frequencies of up to 1 kHz and more).

Within the scope of preferred developments of the invention, optical display means are assigned to the evaluation means, which display means output in a suitably visualized fashion a result of the tire pressure measurement (if appropriate additionally a result of further tire parameter measurements, such as for example a profile depth measurement). In this context, it is appropriate, for example, to transmit, in the manner of a traffic light or similar digital or symbolic visualization, a correspondingly prepared threshold value signal to a user (for example a driver directly in the cockpit), which threshold value signal simply signals fault-free further travel to the driver for the case of measurement of tire pressure in accordance with standards, and requests the driver to stop and inflate to carry out repairs only in the event of an abnormality (for example the tire pressure dropping below a critical predefined threshold value).

It also lies within the scope of preferred embodiments of the present invention to combine the measurement of tire pressure with further tire parameter measurements. In this context it is, according to the development, advantageous and synergetic additionally to use the already used optical recording means in order to carry out, for example, a tire profile depth measurement, and it is further preferred to carry this out by means of the same movement process or travel-over process by the vehicle. Optical recording means configured, for example, in the way described in EP 1 952 092 B1 by the applicant would therefore be suitable, on the one hand, to acquire tire profile information from the image signal by means of the projection of optical line signals onto the tire profile and subsequent triangulating image evaluation, on the one hand for acquiring, from the image signal, tire profile depth information which according to the development can then in turn be displayed after filtering, for example, by means of a threshold value. At the same time, this image in the way described in EP 1 952 092 B1 specifies an effective tire width which, according to the present invention, is to be taken into account as a footprint width in the measurement of the tire pressure and serves to this extent to bring about favorable technical synergy in the joint process of acquiring the two tire parameters: the tire pressure and tire profile depth.

As a result, the present invention makes it possible to provide, in a surprisingly simple way, a reliable, low-maintenance and low-fault and flexibly scalable infrastructure for the measurement of tire pressure, which infrastructure is not restricted to the field of fleets or trucks but, as is particularly apparent here provides the advantages of short run-through times, of avoiding virtually any unproductive stationary state and of the possibility of subsequent utilization and evaluation of tire pressure data as desired.

BRIEF DESCRIPTION OF THE DRAWINGS

Further advantages, features and details of the invention can be found in the subsequent description of preferred exemplary embodiments and with reference to the drawings, in which.

DETAILED DESCRIPTION

Figure 1:
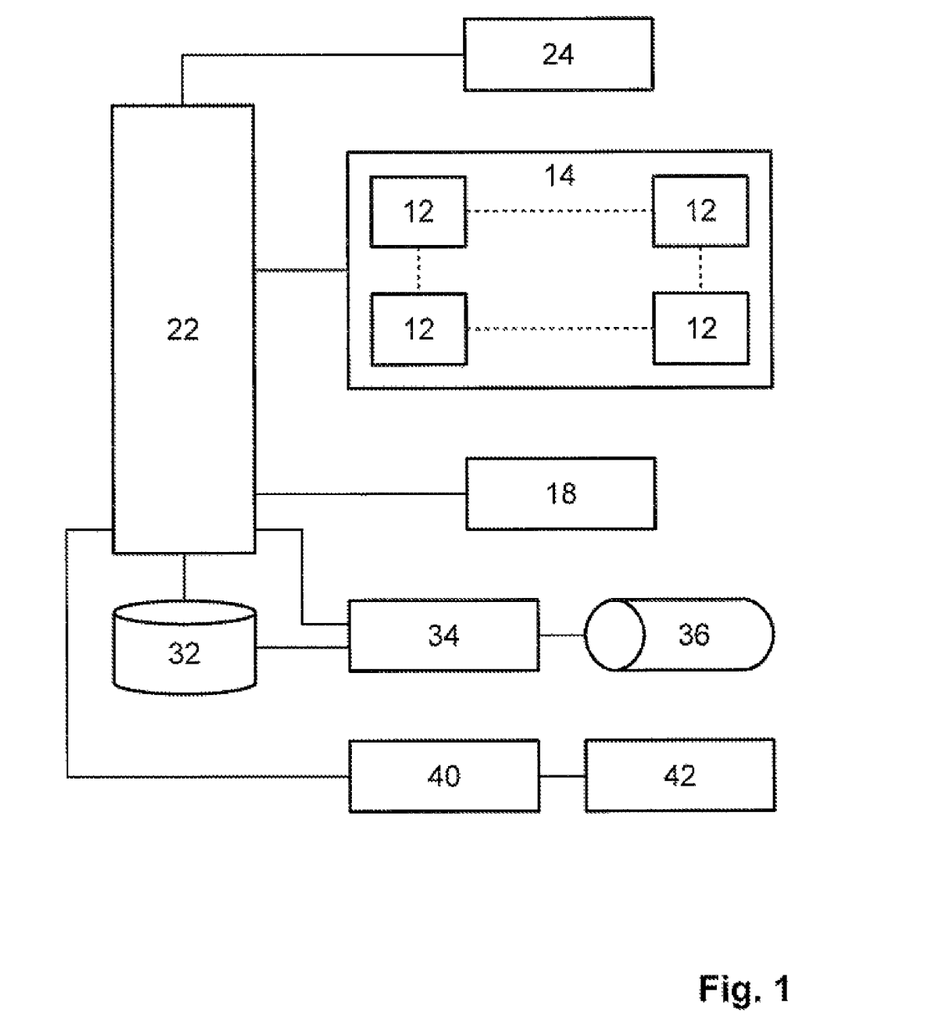
FIG. 1 shows a schematic block circuit diagram with essential functional elements of the apparatus for measuring tire pressure according to a first preferred embodiment of the present invention.
Figure 2:
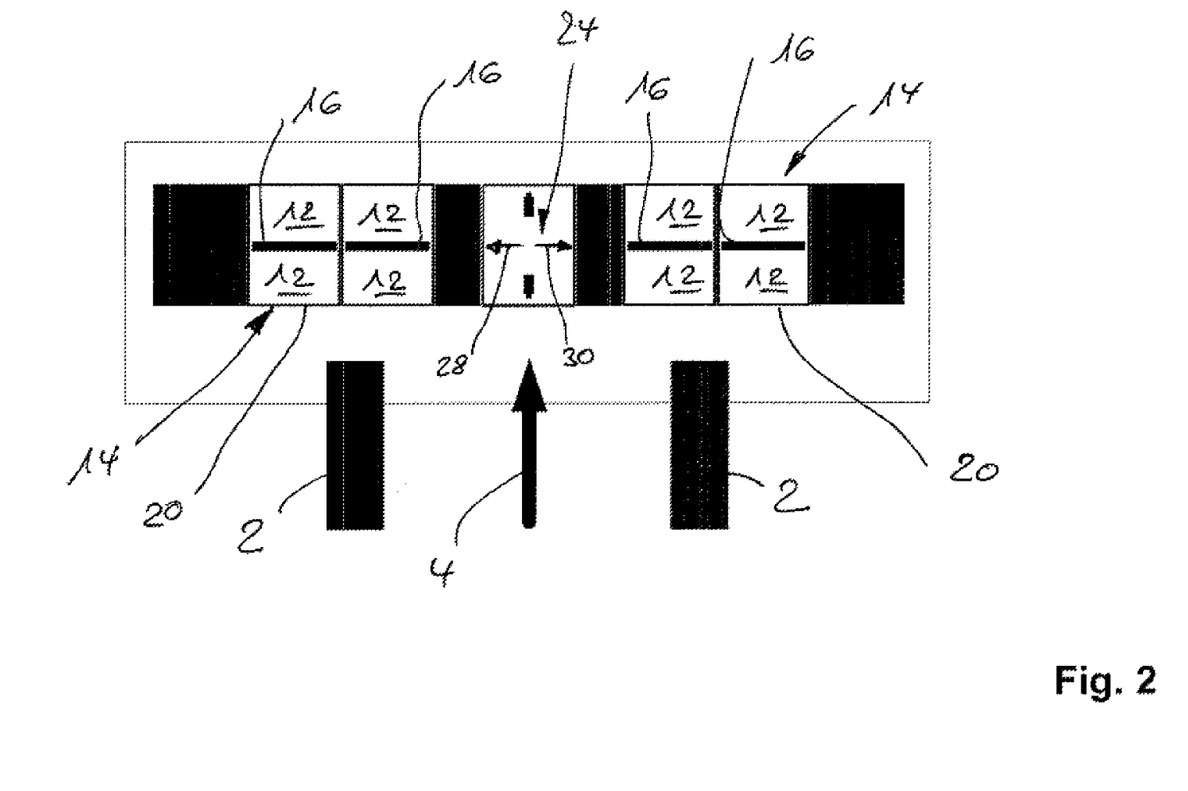
FIG. 2 shows a schematic illustration of the anchoring of such an apparatus in an underlying surface relative to a direction in which vehicles travel over.

FIG. 1 shows in the schematic view the essential functional components of an apparatus for measuring the tire pressure of a tire provided on a moving vehicle, according to a first preferred embodiment. Such an installation, shown by way of example in FIG. 2, provides, let into an underlying surface in order to form a travel-over path for a vehicle to be measured (here a truck), a pair of measuring means 10 which are assigned to a respective tire 2 of a (common) axle and which each have a force sensor unit 14, having four force sensors 12, and a measuring slit 16, arranged in the way shown in FIG. 2 between a respective axle pair of force sensors, for an optical detection unit 18. In the way shown in FIG. 1, the four force sensors 12 of the force sensor unit 14 are mechanically coupled here and therefore connected on the pressure side by a pressure plate 20, as is shown in FIG. 2, and indicated schematically in FIG. 1 by the border around the arrangement of the four force sensors 12.

Firstly, a at the tire profile of a tire which travels over the arrangement (in a direction of travel 4 perpendicular to the direction of the drawing in FIG. 2) is provided, let into the underlying surface, as an optical detection unit 18 underneath the measuring slit 16, wherein this camera arrangement, which is directed at an angle to the tire profile, firstly generates an electronically detectable image signal which is then evaluated by an assigned central processing unit 22, typically implemented as a conventional and suitably programmed PC unit, in order to determine the footprint width.

In this context, that planar supporting face of the tire is considered here to be the "footprint" according to the present exemplary embodiment, said supporting face being determined by the footprint width (extending transversely with respect to the direction of travel and measured by the optical detection unit 18) as well as the footprint length, extending essentially in the direction of travel and, in the present exemplary embodiment, measured by the force sensor unit 14 and/or a continuous signal of the force sensor unit 14, evaluated by the central processing unit 22, when the respective tire travels over the force sensor unit 14.

In addition and advantageously within the scope of the present invention, a temperature detection unit 24, which is provided implemented as an infrared-sensitive and contactless thermo sensor system on an elongated dome 26 between the two force sensor units 14 shown in FIG. 2 is also assigned to the measuring means implemented from the force sensor unit 14 and optical detection unit 18, and said temperature detection unit 24 has thermal sensors oriented in such a way that they are directed in the directions 28 and 30, respectively, of the arrows, in each case onto an inner wall of a vehicle tire which rolls over the force sensor pressure plates 20.

The specific implementation of the unit illustrated schematically in FIG. 2 is therefore suitable for detecting the air pressure of vehicles on an axle basis, i.e. at the same time or jointly for respective tires seated at the ends of a vehicle axle.

As a result, a typical embodiment of such an arrangement has a width of approximately 250 to 300 cm, wherein a width (i.e. respectively measured perpendicularly with respect to the direction of travel) of a pressure plate 20 relates to approximately 50 to 75 cm, and an extent of a pressure plate 20 in the direction of travel is typically 75 cm.

The FIG. 1 illustrates further functional components which are assigned to the apparatus according to FIG. 2 in order to obtain an operationally capable system.

In this way, firstly to the central processing unit 22, which receives the output signals of the optical detection unit 18 (for detecting and determining the footprint width), of the force sensor unit 14 (for detecting or determining the footprint length) and of the temperature detection unit 24 (for detecting a compensating temperature signal of a tire to be measured) and then generates a tire pressure signal from this data in the way described below, is additionally connected to a database unit 32 which is designed to store the tire pressure data generated by the central processing unit, and is further preferably connected to an identification unit 34 which makes available an identification which identifies a respective vehicle (typically an official identification generated by means of a camera 36), which is suitable as an additional possible index for a respective tire pressure data record. This signal can then also be suitable in developments of the invention in order to authorize access to the database, to enable output processes described below or to permit other operations and evaluations.

Within the scope of the present embodiment of the invention, the camera unit 36 can be directed here as a single image recording unit at a corresponding number plate region of a vehicle on the apparatus in FIG. 2, and can be alternatively composed of a pair of cameras which, in a way which is typically useful in vehicle combinations with different identifications for the tractor unit and semitrailer, two cameras on the front and the rear, directed at the respective official identifications. The identification unit 34 then replaces, in an otherwise known fashion, a corresponding identification image signal into identification data which are, for example, favorable for indexing in this way the tire pressure data which is to be stored in the database 32.

In addition, the embodiment of the invention according to FIG. 1 has an output unit 40 which is connected to an in the present exemplary embodiment as a traffic light (symbol unit or threshold value unit). Specifically, the display unit generates, from tire pressure measurement signals of the central processing unit, a signal which is to be displayed directly to, for example, a vehicle driver, wherein this is implemented in the illustrated exemplary embodiment as, for example, a red/green signal of the display unit 42 and indicates to the driver whether a sufficient or else incorrect tire pressure is present, with the result that a direct message is issued to the vehicle driver, for example now to drive to a tire pressure inflating station or to take measures.

The operation of the apparatus shown in FIGS. 1 and 2 is as follows. The vehicle driver steers the vehicle, for example a lorry, at a snail's pace over the arrangement shown in FIG. 2. A specific travel-over duration of a respective pressure plate 20 by a respective tire traveling over there is therefore approximately 0.4 to 1.2 s.

During the traveling over, the force sensor unit 14 continuously picks up the pressure signal by means of the individual sensors 12 which are mechanically coupled by the plate 20; a typical measuring frequency is approximately 200 Hz, with the result that in the way shown in FIG. 3 a first curve profile 50 of a first pair of force sensors 12 (in the axial direction of the vehicle) firstly experiences a steep rise and subsequently drops continuously, while a second curve profile 52, to this extent corresponding to the second pair of the of the force sensor units 12 in turn connected downstream axially with respect to one another in the direction of travel, firstly exhibits a gentle rise in pressure, with a relatively steep drop after the maximum value is reached. In addition, FIG. 3 shows a sum signal of the two individual signals 54, which sum signal has the respective ramps, an approximately constant measurement time between the two maximum values as critical parameters for the further evaluation.

Figure 3:
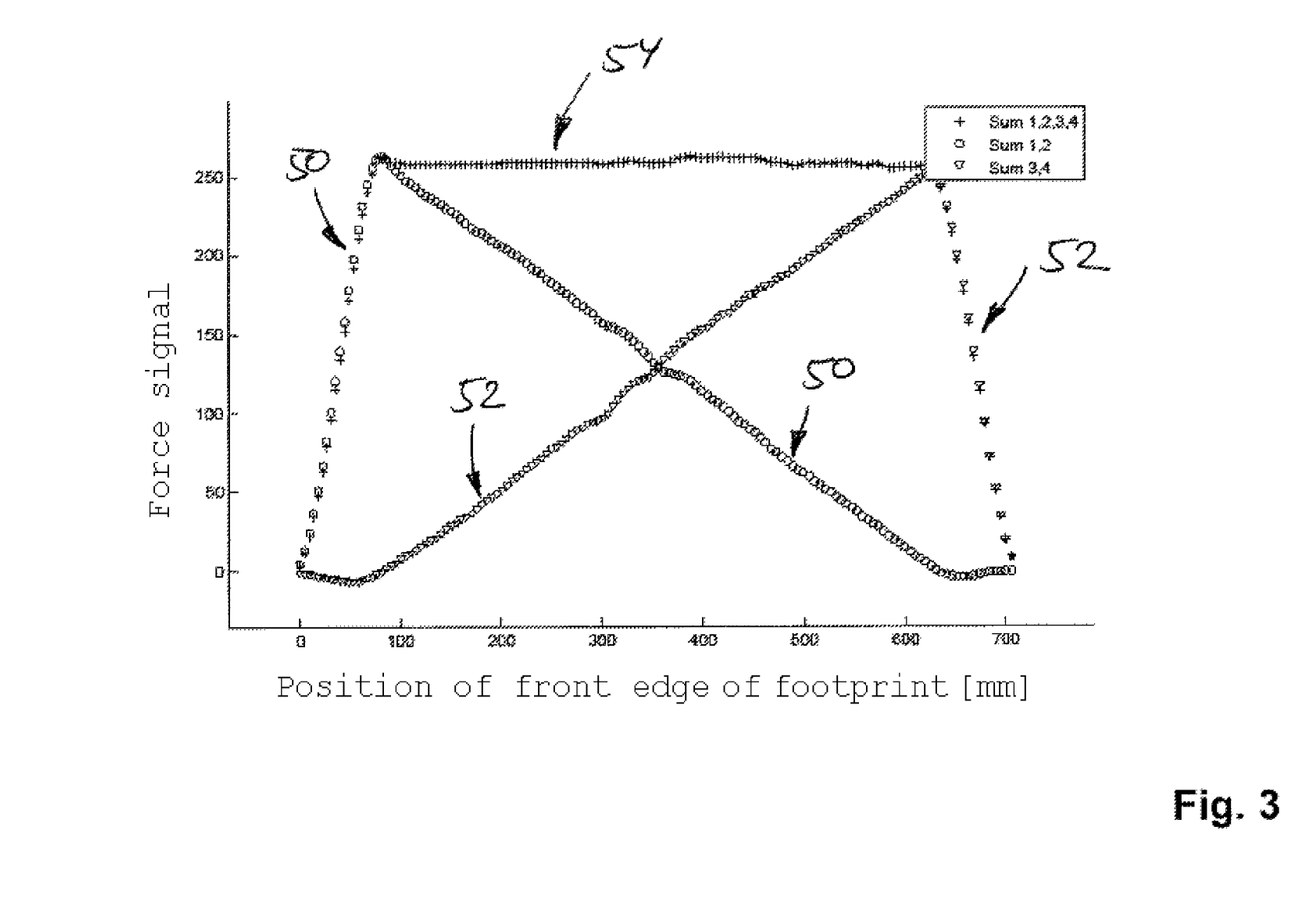
FIG. 3 shows an illustration of a pressure signal profile plotted over time for evaluation for determination of the footprint length.

In addition, FIG. 3 shows a sum signal of the two individual signals 54, which sum signal has the respective ramps and an approximately constant signal level between the two maximum values (and the duration thereof) as critical parameters for the further evaluation.

Correspondingly, the respective force/travel profiles represent the respective rolling upward or downward and impacting of the tire up to a maximum force value, with respectively different edge profiles, related to a leading and respective trailing sensor pair. The respective steep edges are then a basis for the aforementioned determination of an effective footprint length, wherein a final effective footprint length is then determined from the relatively short rising edge of the first, leading sensor pair and a falling edge of the second, trailing sensor pair by addition. "Length" is understood here to be a first dimension of the footprint area in the direction of travel, and "effective" is understood to be those regions in which an input of force into the force pickup is at a maximum, corresponding to a linear or approximately linear rise in the signals in FIG. 3 when traveling up (or decreasing when traveling down). By means of otherwise known techniques (not explained here in more detail) of signal evaluation, the linear region (corresponding here also in an inventive fashion to the region of approximately maximum gradient) is detected. According to the invention it has then proven advantageous that this region can then be used, as described, directly for acquiring the desired (effective) footprint length.

Correspondingly, the footprint length acquisition process here is based on a uni-dimensional force profile evaluation plotted over time (or plotted over the corresponding location, fixed by the assigned length of the force pickup plate).

The central processing unit 22 correspondingly calculates the pressure measured value profiles for the effective footprint length (FIG. 3 shows in this respect a corresponding length profile over the pressure plate along the horizontal time axis and shows the 200 Hz clocking).

Figure 4:
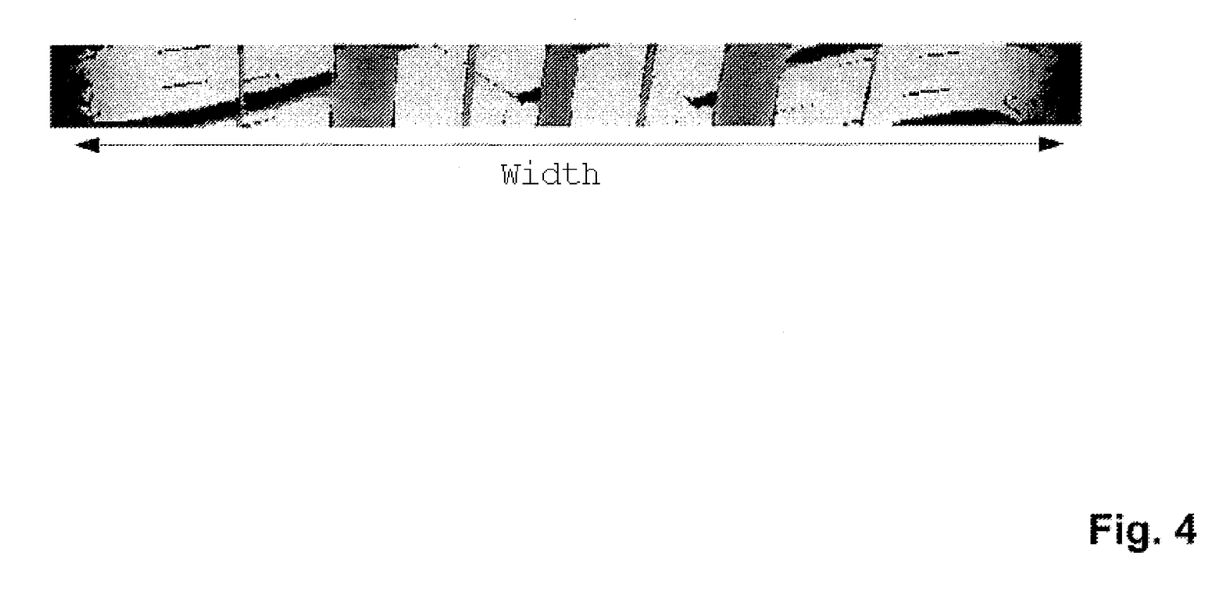
FIG. 4 shows an illustration of an exemplary image which is recorded on the profile side by the optical image recording means, for the purpose of determining a profile width or foot width.

In addition, the central processing unit 22 receives the profile width signal of the optical detection unit 18 (for example of a camera unit). An exemplary image is shown in FIG. 4 and is used to approximate the footprint width. The multiplication of footprint width and the footprint length then gives rise to the footprint area, wherein the current (actual) tire pressure of the vehicle is then determined from [force acting on the force sensor unit]/footprint area×correction factor, and wherein the correction factor based on heuristic and/or predetermined data takes into account of any influences of the tire wall rigidity and other factors. However, within the scope of the present invention, it has proven advantageous to use as a correction factor a correction function which suitably takes into account a footprint width, and in addition, if appropriate, a ratio of groove area to tread area (which can be acquired by further optical evaluation from the image of the optical detection means and therefore permits more precise effective dimensioning of the area, since, of course, grooves themselves do not contribute directly to the pressure measurement but instead merely the actual rubber tread area). In addition, a footprint shape which deviates from an idealized rectangular shape can be taken into account, wherein the correction function which is used in a simplifying fashion as a "correction factor" can then be calibrated and adapted in an otherwise known fashion by comparison measurements, simulations or the like.

In addition, the central processing unit 22 receives a current tire temperature such as is made available in a way described above by means of the temperature detection unit 24 or the infrared sensors 26 provided therein. This temperature signal is used to standardize the actual pressure acquired in the way described above to a rated inflation pressure (for example air pressure). This is initially based on the fact that a rated inflation pressure, in the sense of a legal or standardized specified value, is always prescribed for ambient temperatures, typical value 20° C. However, within the scope of the invention it has become apparent that operationally warm tires in some cases drastically exceed this rated inflation pressure, with the result that a currently measured inflation pressure at a tire temperature which deviates from approximately 20° C. in the upward or downward directions in turn significantly falsifies the desired tire pressure measurement value which is related to the rated value. Such a context is clarified by the graphic in FIG. 5 which shows the temperature dependence of a tire pressure within the scope of the invention, in that specifically the tire pressure is plotted against the temperature and the three measurement curves 60, 62, 64 shown describe the behavior of the tire pressure when said measurement curves 60, 62, 64 have generated a typical rated tire pressure of 8 bar (for trucks) at respective different inflation temperatures (−20° C. for curve 64, 20° C. for curve 60 and 60° C. for curve 62). Therefore, for example the middle curve 60 shows that a tire which is inflated with 8 bar at 20° C. at a (certainly not atypical) operating temperature of 60° C. has (or must have) an actual pressure value of 9.5 bar in order to still be inflated in accordance with standards.

Figure 5:
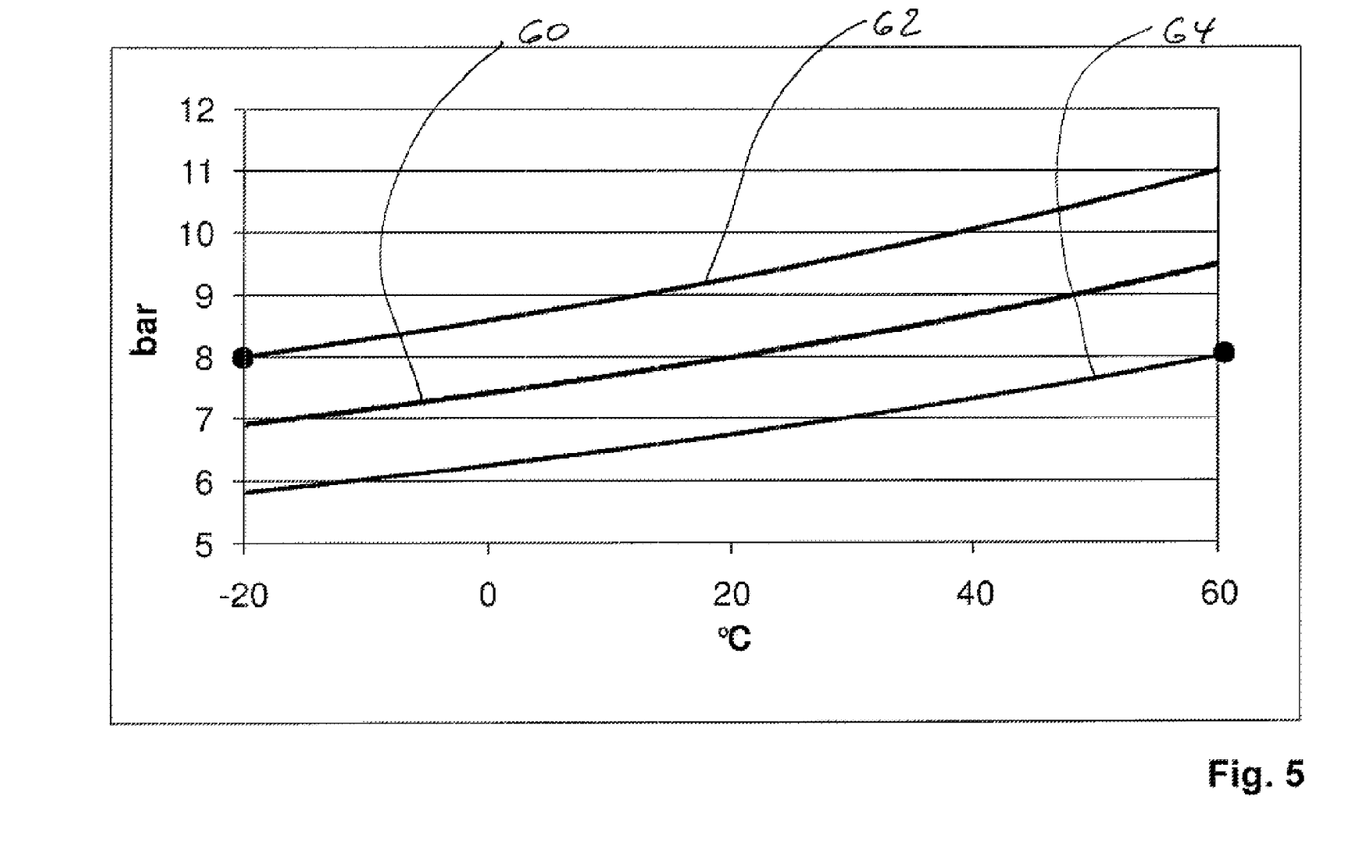
FIG. 5 shows a pressure/temperature diagram clarifying the relationship between a tire pressure and a tire temperature at various inflation temperatures

This temperature compensation is performed by the central processing unit within the scope of the present invention, wherein calculation schemes or tables according to FIG. 5 are correspondingly used in a functional or data-related fashion.

The central processing unit then passes on the actual pressure result corrected to a rated inflation pressure for storage to the database unit 32 wherein this tire pressure value is combined with an official identification, acquired in parallel during the traveling over of the identification unit 34 (or the electronically detected and converted identification image of the camera 36) of a respective vehicle as an index for the database 32.

The traffic light display unit 42 then outputs, in reaction to a control signal of the output unit 40, a green signal (typically visible to a driver of the vehicle from the driver's cab) if the compensated tire pressure is within a predetermined threshold value interval around the expected rated value.

The present invention is not restricted to the simplified block diagram, implemented on the basis principle, in FIG. 1 with the further illustrations.

It is therefore firstly possible in terms of hardware technology to configure the specific embodiment (for example according to FIG. 2) in an alternative way; firstly, it would be favorable, for example, in conjunction with truck tires, to configure the pressure plates, which are each shown at the ends in FIG. 2 with respectively assigned force sensor units, in each case in pairs, in order in this respect also to be able to detect double wheel axles of trucks using a travel-over process. Although this entails geometrically additional complexity, such a double-wheeled arrangement can also be disconnected without difficulty by means of data processing means.

While in the manner described above the pressure signal unit 14 and its time profile were used to determine the footprint length, it is alternatively possible within the scope of further refinements of the invention also to detect the footprint length by means of the optical apparatus (for example a camera unit directed at the tire profile from below through a suitable observation slit). For this purpose, given a known geometry of, for example, such an image window with which the current depiction of the tire profile which is traveled over is sequentially detected, it would be possible for a footprint length corresponding to the rolling over process to be determined from the sequence of individual images (in the profile pattern which successively fills the image window and in the profile pattern which is released again during the traveling up and traveling down) and knowledge of an image recording frequency by corresponding geometric evaluation, in addition to the footprint width which is detected in any case directly here in the transverse direction from the image (for example approximately FIG. 4). This advantageously provides the possibility of detecting any footprint deformation; e.g. the result of a significant underpressure and an associated tire deformation, from the image or the image sequence.

It also lies within the scope of preferred developments of the invention additionally to configure the evaluation unit 40 in a way which is suitable for various authorization, payment, data transmission and coordination functions: it is therefore preferred, on the one hand, to assign to the output unit a transaction and/or output unit (not shown in the figures) with which, for example, a vehicle driver can receive, in addition to the traffic light display 42, a precise detailed measuring protocol if he activates a payment process for this purpose, and alternatively if his motor vehicle license plate number (from the database 32) is detected as being known and/or authorized, and a specific data information item is then supplied to him via a printer unit or some other output unit (not shown) additionally or alternatively, for example, via a wireless communication (E-mail, sms, etc.). It is also possible to understand the output unit in a suitable way as participating in a superordinate, networked system configuration in which the unit in FIG. 1 is connected in the manner of a client to a, for example, supra-regional, even country-wide network of various stations which are implemented in the method described according to FIG. 2 and which permit tire pressure data to be combined and processed appropriately in a way which is compatible with a fleet.

A particularly elegant and preferred variant and development of the invention consists in using the optical detection unit 18 in order to acquire tire profile depth data with the latter in addition to and as well as the tire pressure data generated in the way described above. For this purpose, the central processing unit 22 evaluates the image signal, generated by the optical detection unit 18, in the manner of a triangulation in order to obtain not only a tire width signal but in order also to calculate a tire profile depth from a tire profile image (for example a sequence of tire profile images; approximately 3 to 5 successive tire profile images can typically be generated during a traveling over process). In this respect reference is made to the disclosure content in EP 1 952 092 B1, which is to be considered with respect to the procedure for generating a tire profile depth signal as being associated with the present invention and included in the present application. It is therefore, in particular, also preferred, whether only for determining the tire profile width (see above) or else for additionally acquiring the tire profile depth, to implement the optical detection unit with lighting means in the form of strip-shaped light sources, typically implemented by laser strips which are radiated onto the tire profile at a predetermined angle and which permit, in the recording of images, an improved and simplified or higher-resolution way of measuring the tire profile depth or the tire width.

In this respect, the generic implementation of the exemplary embodiment in FIG. 1 could then be supplemented with an additional way of suitably outputting tire profile depth data, wherein said data is then fed, either combined with tire pressure measurement information (and for example subjected to a logic AND operation), to the display 42 and additionally completes and/or informatively the data which is accessible to the respective interested party, for example the truck driver.

As a result, the present invention provides, in a surprisingly simple and elegant way, a means of reliably generating in a very short measuring time with comparatively little expenditure on hardware and without the need for stationary times, relevant tire pressure data merely by causing the vehicle with the tires to be measured to travel over, and of, if appropriate, supplementing this tire pressure data with tire profile data, in this process, in particular, also of combining optical detection means synergetically for both purposes and thereby ensuring that the tire pressure, as a variable which is also critical for traffic and is relevant for traffic safety, can be measured more frequently and reliably.

The invention claimed is:

1. An apparatus for measuring the tire pressure of a tire provided on a moving vehicle, comprising:
    measuring means which are provided on an underlying surface so as to interact with a tire for generating, in reaction to the tire traveling over said measuring means, a measurement signal which is evaluated electronically;
    evaluation means for receiving the measurement signal and outputting a tire pressure signal which corresponds to the tire pressure; and
    the measuring means has optical recording means for detecting a tire width as a footprint width of a footprint of the tire which is formed as it travels over the underlying surface, and the evaluation means is designed to determine a footprint length of the footprint from a sequence of tire width data items generated by the optical recording means and/or from a profile of a pressure measurement signal generated by the measuring means, to determine the tire pressure from a footprint area acquired by the (1) footprint length, (2) footprint width and (3) a force acting on the footprint area through the tire.

2. The apparatus as claimed in claim 1, wherein the measuring means has temperature sensor means which act in a contactless fashion on the tire and is adapted to generate a tire temperature signal, and the evaluation means is designed to process the tire temperature signal during the generation of the tire pressure signal which is dependent on the tire temperature.

3. The apparatus as claimed in claim 2, wherein the temperature sensor means has an infrared-based temperature sensor which is directed at a sidewall of the tire.

4. The apparatus as claimed in claim 1, wherein the measuring means has a force sensor apparatus which has a plurality of force sensors which are mechanically coupled to one another and are designed to be traveled over by the vehicle.

5. The apparatus as claimed in claim 4, wherein the plurality of force sensors are arranged transversely and/or parallel with respect to the direction of travel of the vehicle and are connected by means of a common pressure plate which is configured to make contact with the tire.

6. The apparatus as claimed in claim 4, wherein the force sensor apparatus is designed to generate a sequence of the pressure measurement signal with a frequency in the range between 10 and 500 Hz.

7. The apparatus as claimed in claim 1, wherein the optical recording means has an image-recording unit which is directed at the tire profile and is designed to generate at least one image which has tire width information and is evaluated electronically.

8. The apparatus as claimed in claim 7, wherein the optical recording means is designed to generate at least one linear light signal which is directed at the tire profile, wherein an image recording unit detects an image pattern of the light signal on the tire profile and permits determination therefrom by the evaluation means, of a tire profile depth measured value as a tire parameter which is additional to the tire pressure signal.

9. The apparatus as claimed in claim 8, wherein the optical recording means is adapted to generate at least three successive images during the traveling over, and to generate images with an image repetition frequency >1 kHz.

10. The apparatus as claimed in claim 1, wherein the evaluation means is assigned optical display means for displaying the tire pressure measurement signal and a further tire parameter value.

11. The apparatus as claimed in claim 10, wherein the display means has symbol means and/or threshold value means for outputting an average of a digital color value or symbol signal which is dependent on at least one predetermined threshold value.

12. The apparatus as claimed in claim 1, wherein the measuring means is located transversely with respect to the traveling direction of the vehicle so that tire pressure measurement can take place simultaneously for a plurality of tires on an axle of the vehicle.

13. A method for measuring the tire pressure of a tire provided on a moving vehicle, comprising the steps of:
    acquiring a footprint length of a tire footprint which is formed on an underlying surface, by measuring at least one of pressure and optical images of the tire;

acquiring a footprint width of the tire footprint by recording optical images by means of an image recording means directed at a profile of the tire; and determining the tire pressure from a footprint area, acquired from the (1) footprint length, (2) footprint width, and (3) a tire force and/or pressure force acting thereon.

* * * * *